Patented Oct. 10, 1950

2,525,478

UNITED STATES PATENT OFFICE 2,525,478

LIQUID ANTIFREEZE COMPOSITION

John P. Cunningham, San Francisco, Calif., assignor to Shell Development Company, San Francisco, Calif., a corporation of Delaware No Drawing. Application March 19, 1948, Serial No. 15,960

6 Claims. (Cl. 252—73)

This invention relates to anti-freeze compositions, and more particularly to aqueous solutions of ethylene glycol and specific hexylene glycols, as hereinafter defined.

The use of aqueous solutions of ethylene glycol or other glycols, such as propylene glycol and butylene glycol, as anti-freeze compositions is well known. It has now been discovered, however, that aqueous solutions containing both ethylene glycol and certain hexylene glycols, namely, the hexylene glycols which do not have a hydroxyl group attached to a terminal carbon atom, which preferably have a tertiary carbon atom to which is preferably attached a hydroxyl group, and wherein the two hydroxyl groups are preferably attached to carbon atoms separated by at least a third carbon atom, e. g., 2-methyl-2,4-pentanediol, exhibit unusual and unexpected behavior which makes such solutions especially suitable as anti-freeze compositions.

Generally, aqueous solutions of ethylene glycol have freezing points below those of the above defined hexylene glycols at equivalent mol per cent concentrations. For example, a 17 mol per cent solution of ethylene glycol has a freezing point of about —11° F., whereas a 17 mol per cent solution of 2-methyl-2,4-pentanediol has a freezing point of about —2° F. This difference becomes more marked at higher concentrations. The present invention is predicated on the discovery that the substitution of a quantity of the above defined hexylene glycols, e. g., 2-methyl-2,4-pentanediol, for an equimolar amount of ethylene glycol, in an aqueous solution, results in a depression of the freezing point rather than an increase therein, which increase would have been expected in view of the higher freezing points of the aqueous 2-methyl-2,4-pentanediol solutions. Thus, an aqueous solution containing ethylene glycol and 2-methyl-2,4-pentanediol in equal quantities on a weight basis, and containing a total glycol concentration of 17 mol per cent, has a freezing point of about —18° F., whereas the expected freezing point would be intermediate between —11° F. and —2° F.

The aqueous compositions of the present invention should have a total of from about 5 to about 30 mol per cent of glycol present in the solution, and the ratio of the glycols may vary from about 20% to 90% by weight of ethylene glycol to about 80% to 10% by weight of a hexylene glycol, i. e., the weight ratio of ethylene glycol to hexylene glycol may vary from about 1:4 to about 9:1. Preferably, the present aqueous compositions have a total of from about 10 to about 22 mol per cent of glycols present in the solution, with the ratio of glycols being from about 50% to about 80% by weight of ethylene glycol and from about 50% to about 20% by weight of the present hexylene glycols, i. e., the weight ratio of ethylene glycol to hexylene glycol being from about 1:1 to about 4:1.

In order to achieve the advantages of the compositions of the present invention, it is important that the above limits be observed since, for example, if the total glycol concentration be below the stated limit, namely, about 5 mol per cent, the freezing point depression over that obtainable with either glycol becomes insignificant, and if the ratio of glycols be extended beyond the stated limits, the freezing point depression over that obtainable with ethylene glycol becomes relatively small and may reach a negative value.

In the following examples, the present invention is readily demonstrated by using 2-methyl-2,4-pentanediol as illustrative of the present hexylene glycols. It will be noted that this particular hexylene glycol does not have a hydroxyl group attached to a terminal carbon atom, it has a tertiary carbon atom to which is attached a hydroxyl group, and the carbon atoms attached to the hydroxyl groups are separated by a third carbon atom; 2-methyl-2,4-pentanediol, therefore, represents a preferred hexylene glycol for compounding the compositions of the present invention, as illustrated in the following examples.

The following Table 1 illustrates some advantages of the compositions of the present invention:

TABLE 1

| Total glycol in solution, mol. Per cent | Ratio: Ethylene glycol to 2-methyl-2,4-pentanediol, Per cent by weight | Freezing Point, °F. |
| --- | --- | --- |
| 10 | 100:0 | 8.5 |
| 10 | 0:100 | 9.2 |
| 10 | 40:60 | 5.8 |
| 10 | 70:30 | 5.8 |
| 15 | 100:0 | —8.2 |
| 15 | 0:100 | 0.2 |
| 15 | 80:20 | —11 |
| 15 | 50:50 | —11 |
| 20 | 100:0 | —24 |
| 20 | 0:100 | —6 |
| 20 | 20:80 | —28 |
| 20 | 90:10 | —28 |
| 22 | 100:0 | —30.5 |
| 22 | 0:100 | —8 |
| 22 | 70:30 | —35 |

Ethylene glycol of laboratory grade was employed in all of the above compositions.

The following examples further illustrate preferred embodiments of the present invention, which is not to be considered as limited thereby.

Example I

Various quantities of a glycol composition contaiging 70% by weight of ethylene glycol and 30% by weight of 2-methyl-2,4-pentanediol were dissolved in water, and the freezing points determined; these data are shown in the following Table 2. For comparison, the freezing points of aqueous solutions of ethylene glycol and 2-methyl-2,4-pentanediol in equimolar concentrations, are also given.

TABLE 2

| Total glycol in solution, Mol per cent | Freezing Point, °F. | Freezing Point | |
|---|---|---|---|
| | | Ethylene glycol, °F. | 2-methyl-2,4-pentanediol, °F. |
| 11.8 | 0 | 2.2 | 4.1 |
| 16.9 | −18 | −14 | 2.2 |
| 23.3 | −38 | −34.6 | −10 |

Example II

Example I was repeated using a glycol composition containing 60% by weight ethylene glycol and 40% by weight 2-methyl-2,4-pentanediol. These data are shown in the following Table 3.

TABLE 3

| Total glycol in solution, Mol per cent | Freezing Point, °F. | Freezing Point | |
|---|---|---|---|
| | | Ethylene glycol, °F. | 2-methyl-2,4-pentanediol, °F. |
| 11.2 | 2 | 5 | 7 |
| 13.55 | −6 | −3 | 2.5 |
| 19.05 | −24 | −20.8 | −5 |

Comparison of the above data shows a significant decrease in the freezing point of aqueous ethylene glycol solutions when 2-methyl-2,4-pentanediol is substituted, mol for mol, for a portion of the ethylene glycol. This unobvious and surprising result makes the aqueous compositions of the present invention especially suitable for use as the anti-freeze fluid in internal combustion engines.

The aqueous solutions of ethylene glycol and 2-methyl-2,4-pentanediol of the present invention may be prepared by any convenient means, such as by dissolving an appropriate quantity of each glycol in water. It is especially convenient, however, as indicated in the above specific examples, to prepare a mixture of the two glycols in appropriate quantities so that the resulting compositions may be subsequently dissolved in water to produce the aqueous glycol compositions of the present invention. In this manner, the glycol concentrate may be conveniently stored and shipped, and an appropriate quantity thereof incorporated in water when desired. Such glycol concentrates, containing from about 20% to 90% by weight of ethylene glycol and from about 80% to 10% by weight of the hexylene glycol, and preferably from about 50% to 80% by weight of ethylene glycol and from about 50% to 20% by weight of the hexylene glycol, are new compositions of matter and are within the scope of the present invention. Substantially pure glycols may be used in preparing the present glycol concentrates, or aqueous glycol compositions, but the usual impurities of commercial grade glycols do not adversely affect the results obtainable by the compositions of the present invention. The glycol concentrates, as above defined, are substantially non-corrosive and do not significantly adversely affect rubber.

In a substantially identical manner, other hexylene glycols may be employed in place of 2-methyl-2,4-pentanediol in preparing the glycol concentrates and aqueous glycol compositions of the present invention, as above described. As illustrative of such other hexylene glycols which may be employed, reference is made to 2-methyl-2,3-pentanediol; 2-methyl-3,4-pentanediol, 2,4-hexanediol; 2,5-hexanediol; 3-methyl-2,4-pentanediol; and 3-methyl-3,4-pentanediol.

Other materials which impart special properties to the aqueous glycol solutions, or the glycol concentrates, may be incorporated therein. For example, anti-foaming agents such as kerosene, alkyl or dialkyl phthalates, such as normal or secondary dibutyl phthalate, and the like, anti-corrosion agents such as sodium nitrite, or a nitrite salt of a secondary amine, for example, dicyclohexylamine nitrite, and the like, buffer materials, such as barium hydroxide and di- or triethanolamine, and various dyes for identification purposes, may be incorporated in the compositions of the present invention.

The aqueous glycol compositions of the present invention are especially suitable for use as heat transfer fluids in cooling systems of automobiles, airplanes, and other liquid cooled combustion engine installations.

Among other advantages of the present aqueous glycol compositions may be mentioned the excellent viscosity characteristics, i. e., the present compositions remain adequately fluid for the present uses at temperatures substantially as low as their freezing points. A further advantage is the failure of the present aqueous glycol compositions to materially adversely affect rubber, such as by causing swelling. Another important advantage of the present compositions is that loss of ingredients under normal engine operation by evaporation is negligible.

The invention claimed is:

1. A liquid anti-freeze composition comprising water, ethylene glycol and 2-methyl-2,4-pentanediol, wherein the total glycol concentration is from about 10 to about 22 mol per cent, the remainder being predominantly water, and wherein the weight ratio of ethylene glycol to 2-methyl-2,4-pentanediol is from about 1:1 to about 4:1.

2. A liquid anti-freeze composition comprising water, ethylene glycol and 2-methyl-2,4-pentanediol, wherein the total glycol concentration is from about 5 to about 30 mol per cent, the remainder being predominantly water, and wherein the weight ratio of ethylene glycol to 2-methyl-2,4-pentanediol is from about 1:4 to about 9:1.

3. A liquid anti-freeze composition comprising water, ethylene glycol and hexylene glycol, wherein the total glycol concentration is from about 5 to about 30 mol per cent, the remainder being predominantly water, wherein the weight ratio of ethylene glycol to hexylene glycol is from about 1:4 to about 9:1, and wherein the hexylene glycol does not have a hydroxyl group attached to a terminal carbon atom.

4. A new composition of matter comprising a predominant amount by weight of a mixture consisting of from about 50% to 80% by weight of ethylene glycol and from about 50% to 20% by weight of 2-methyl-2,4-pentanediol.

5. A new composition of matter comprising a predominant amount by weight of a mixture consisting of from about 20% to 90% by weight of ethylene glycol and from about 80% to 10% by weight of 2-methyl-2,4-pentanediol.

6. A new composition of matter comprising a predominant amount by weight of a mixture consisting of from about 20% to 90% by weight of ethylene glycol and from about 80% to 10% by weight of a hexylene glycol which does not have a hydroxyl group attached to a terminal carbon atom.

JOHN P. CUNNINGHAM.

REFERENCES CITED

The following references are of record in the file of this patent:

UNITED STATES PATENTS

| Number | Name | Date |
|---|---|---|
| 2,094,564 | Schenck et al. | Sept. 28, 1937 |
| 2,226,487 | Zink | Dec. 24, 1940 |
| 2,337,650 | Dolian | Dec. 28, 1943 |